No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 1.

Fig. 1.

Witnesses: Inventor:
Thomas Wolfe

No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 2.

Witnesses:
F. G. Fischer
G. W. Thorpe

Inventor:
Thomas Wolfe
By Higdon & Higdon
Attys.

No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 3.

Fig. 3.

Witnesses: Inventor:
F. G. Fischer Thomas Wolfe
By Higdon & Higdon
attys.

No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 4.

Witnesses:

Inventor:
Thomas Wolfe

No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 6.

Fig. 6.

Witnesses:
F. G. Fischer

Inventor
Thomas Wolfe
By Higdon & Higdon
Attys.

No. 628,509. Patented July 11, 1899.
T. WOLFE.
NEWSPAPER FOLDING AND WRAPPING MACHINE.
(Application filed Feb. 28, 1898.)
(No Model.) 7 Sheets—Sheet 7.

Witnesses:
F. G. Fischer

Inventor:
Thomas Wolfe
By Higdon & Higdon
Attys.

United States Patent Office.

THOMAS WOLFE, OF KANSAS CITY, MISSOURI, ASSIGNOR OF ONE-HALF TO WILEY O. COX AND FRANK P. FUOSS, OF SAME PLACE.

NEWSPAPER FOLDING AND WRAPPING MACHINE.

SPECIFICATION forming part of Letters Patent No. 628,509, dated July 11, 1899.

Application filed February 28, 1898. Serial No. 671,954. (No model.)

*To all whom it may concern:*

Be it known that I, THOMAS WOLFE, of Kansas City, Jackson county, Missouri, have invented certain new and useful Improvements in Newspaper Folding and Wrapping Machines, of which the following is a full, clear, and exact description, reference being had to the accompanying drawings, forming a part thereof.

My invention relates to newspaper folding and wrapping machines; and my object is to produce a machine of this character which may be attached to a newspaper-printing press to receive the papers as they are discharged "quarter-folded," as usual, and automatically fold them to mailing size and form and secure around them tightly wrappers containing the names of subscribers, so that immediately after the press stops all of the papers are ready to be mailed.

To this end the invention consists in certain novel and peculiar features of construction and organization of parts, as will be hereinafter described and claimed, and in order that the invention may be fully understood I will proceed to describe it with reference to the accompanying drawings, in which—

Referring now to the drawings, wherein like reference letters and numerals refer to corresponding parts, 1 designates a pair of parallel frames, which are secured in any suitable manner to the floor or platform, so as to constitute like sides of a practically integral framework, and 2 designates standards secured upon said sides at the front end of the frame and provided with notches 3 in their upper ends to form bearings for the shaft 4 of the paper-roll 5, said roll having imprinted thereon at requisite distances apart the names and addresses of subscribers. Just rearward of said standards 2 are a pair of feed-rolls 6 and 6ª, superposed with relation to each other, the shaft of the roll 6 being journaled in the standard 7 and that of roll 6ª in the sides of the frame. At one end said shafts carry, respectively, the intermeshing gear-wheels 8 and 8ª. At its opposite end the shaft of roll 6ª carries a gear-wheel 9, provided, however, with one tooth 10 about equal in width to two of its other teeth and having its periphery concaved slightly in order that it may receive once in each revolution a convex and somewhat more extended tooth 11 of a gear-wheel 12, mounted upon the corresponding end of a shaft 13, journaled in bearings 14 of the frame, and mounted upon said shaft, at the opposite side of the frame and outward of the gear-wheel 8ª, is a gear-wheel 15. A fourth shaft 16, vertically below shaft 13, is journaled in arms depending from the frame, and mounted thereon is the belt-wheel 17, to which motion is imparted by a motor or countershaft through the medium of a belt-wheel. (Not shown.) Said shaft also carries a gear-wheel 18 of the same diameter and meshing with the gear-wheel 15 to drive the same and through the medium of shaft 13, mutilated gear-wheels 12 and 9, and gear-wheels 8ª and 8 rotate the feed-rolls in the direction indicated by arrows, so as to unwind the paper-roll 5 and feed the web of paper rearward at the required speed. It will also be noticed that the use of mutilated-gear-wheels 9 and 12 renders the movement of the paper intermittent—that is to say, when the extended convex-faced tooth 11 of gear 12 engages the concave-faced tooth 10 of gear 9 the movement of the latter ceases as the driving power is removed and remains stationary until the tooth 11 passes and the next tooth of gear 12 takes hold of and starts gear 9, which then continues rotating until said teeth 10 and 11, which may be termed "blank" teeth, again become engaged. The period of rest which the feed-rolls are thus compelled to take is of longer or shorter duration, accordingly as blank tooth 11 is of greater or less length.

19 designates an inclined plane or table, the inclination being slight and rearward, with its front end arranged to receive the web of paper after it passes between the feed-rolls, and said plane or table is provided with depending lugs 20, by which it is bolted to the sides of the frame. At suitable points the table is cut away, as at 21, to reduce its width, and about midway, its length said reduced portion is provided with a transverse groove 22, and secured therein are a pair of metal bars 23, the arrangement being such that a slot 24 is provided between them, or a single slotted bar may be employed, forming in either case a stationary knife.

25 designates a pair of vertical standards, which are secured in any suitable manner to the table or bars 23 and are provided with vertical guide-slots 26.

One side—viz., the front side—of a paste-fount 27, slightly greater in length than the width of the paper, is numbered 28, and said side is of greater length than the fount and projects through the guide-slot 26, and secured to said front side of the fount is a knife 29, having an inclined cutting edge in order that by means of a draw cut the web of paper may be reliably and cleanly severed with each descent of the knife. Said knife is provided with slots 30, engaging set-screws 31, in order that it may be easily and quickly adjusted, if necessary or desirable.

32 designates a paste-roll journaled in the fount and projecting slightly through the open bottom of the same, and 33 a ratchet-wheel upon one end of the shaft of said roll, said ratchet-wheel being adapted to be rotated one step each time the fount is elevated by means of a gravity-dog 34, pivoted to one of the standards 25. The outer ends of the side 28 of the paste-fount are provided with holes 35, into which are hooked the upper ends of links 36, having pin-and-slot connections, as at 37, with the arms 38 of a rock-shaft 39, journaled in bearings 40, secured to the lower edge of the frame.

Figure 2:
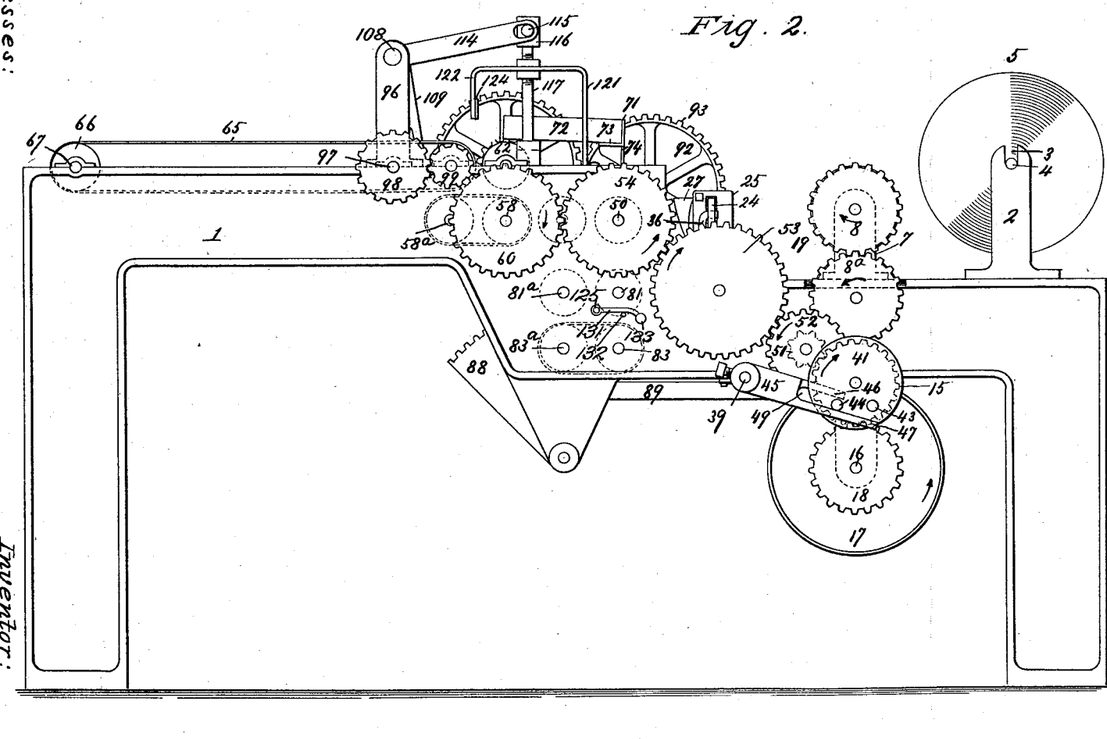
Fig. 2 is a similar view of the opposite side.
Figure 3:
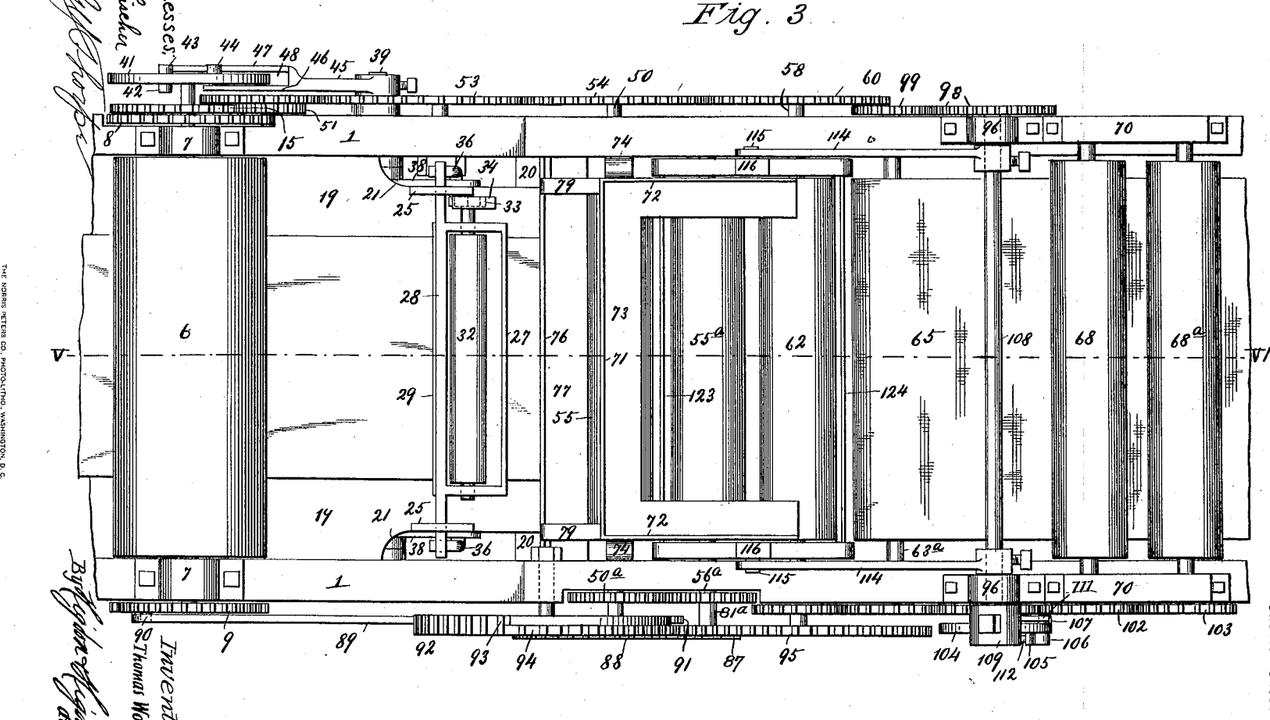
Fig. 3 is a plan view, on a larger scale, of a part of the machine.
Figures 4, 13:
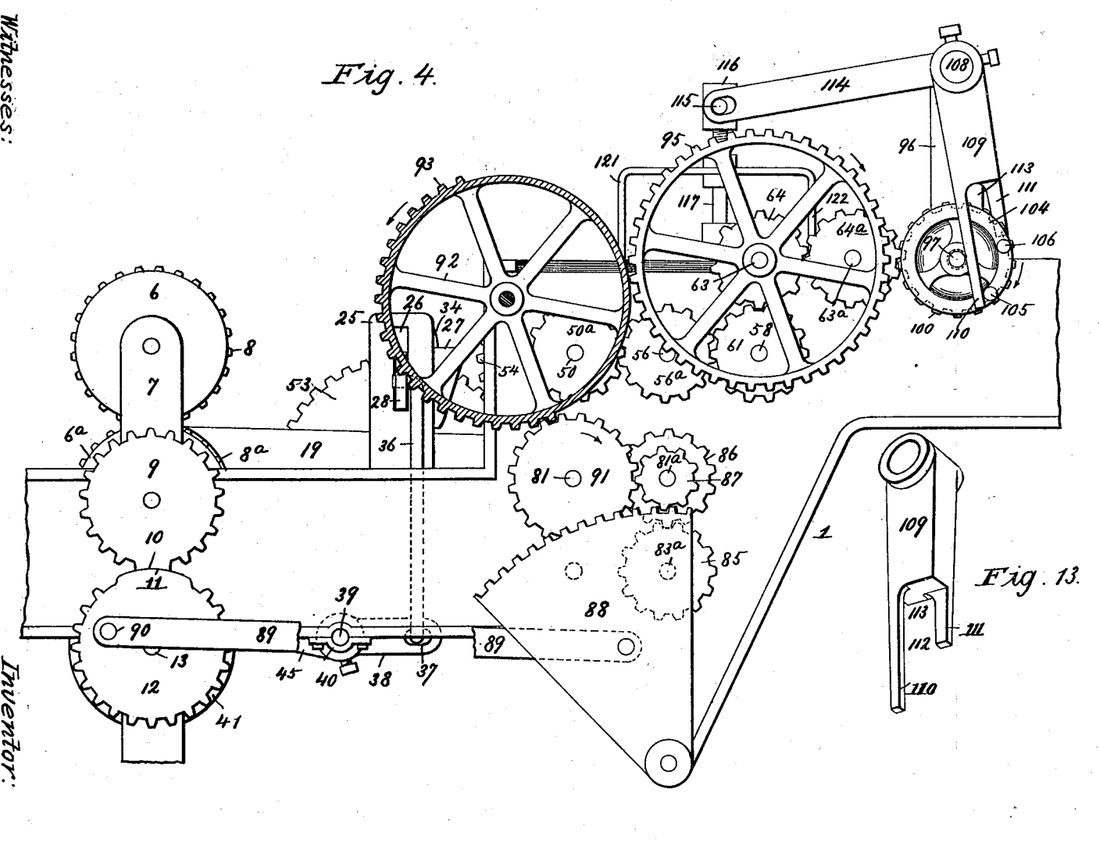
Fig. 4 is a view illustrating one side of that part of the machine shown in Fig. 3, the wheel 92 of the same being sectioned inward of its circular series of teeth 94 in order to disclose the series of teeth 93, extending only half-way around said wheel.
Fig. 13 is a perspective view of an improved rock-arm employed in and forming a part of my invention.

41 designates a disk mounted rigidly upon shaft 13, outward of gear-wheel 15, and carried by said disk is a pin which projects inward, as at 42, and outward, as at 43, and an outwardly-projecting pin 44, arranged at a predetermined distance from the first-named pin and the same distance from the axis of the disk. A forked rock-arm 45 is mounted rigidly upon the corresponding end of the shaft 39, and the branches of said arm are diagonally opposite each other, the inner one, 46, being arranged at the inner side of the disk and of such length that it will easily clear or pass the shaft 13 as the forked arm oscillates and the outer one, 47, at the opposite side of the disk and adapted to engage alternately pins 43 and 44 and of such length that it projects past the center of the disk in order that it may be engaged by pin 44 when at its point of travel most remote from the shaft 39. The arm 45 is not only forked, as at 48, to receive the disk between its branches, but is also provided with a transverse slot 49, said slot being of width to receive snugly pin 43 or 44, as illustrated in Fig. 2. Assuming that the disk is rotating in the direction indicated in Fig. 2, it will be seen that the outwardly-projecting pin 44 in its descent depresses the arm 45 (and thereby elevates the knife and paste-fount) and holds it depressed until said pin has traveled about one-fifth of a revolution and is on its ascending movement, (see Fig. 2,) and as it travels in such ascending movement from a point vertically below the center of the disk to a position slightly beyond that which it occupies in Fig. 2 the arm 45 of course swings a slight distance upward, due to the slight gravitative movement of the knife and paste-fount, a movement in practice which covers only an inch or two of space and is therefore unobjectionable. As the ascending pin 44 reaches a certain position the following pin 43 engages the branch 47 and continues the arm 45 in its depressed position until said pin reaches about the point occupied by the pin 44 in Fig. 2. The continued rotation of the disk now causes the ascending inwardly-projecting pin 42 to engage the under side of short branch arm 46 and by raising the latter cause the knife and paste-fount, respectively, to sever the wrapper-web and apply a strip of paste to the end of the severed portion. (See Fig. 5.) As these operations occur the upward pressure upon the arm 45 is instantly transformed into a downward pressure, because at the instant pin 42 clears the free end of branch arm 46 the now descending pin 44 presses down on the long branch arm 47. In consequence there is practically no rest between the termination of the down and the beginning of the upstroke of the knife and paste-fount and the way is clear for the moving wrapper-web. There is a noticeable period of rest (relatively speaking) between the termination of the up and the beginning of the down movements of the knife and paste-fount, this rest being desired to give the wrapper-web ample time to travel the requisite distance to provide sufficient material in advance of the knife to form a new wrapper. This object is accomplished by holding the arm 45 depressed by pins 44 and 42 until the pin 42 can reach the branch arm 46 and raise the same, as explained. With each up movement of the knife and paste-fount the gravity-dog 34 in the path of the ratchet-wheel 35 causes the latter to move one step and the roll to present a new surface—viz., one from which the paste has not been removed—for engagement with the front end of the wrapper completed at the end of the next downward movement of the knife.

Journaled in the frame at a suitable height and distance rearward of the feed-rolls is a shaft 50, and said shaft is driven continuously in the direction indicated by the arrow by the gear-wheel 15 through the medium of gear-pinion 51, gear-wheel 52, formed integral with said pinion, gear-wheel 53, meshing with wheel 52, and gear-wheel 54, mounted rigidly upon said shaft 50, pinions 51 and wheels 52 and 53 being simply to transmit motion, and therefore mounted upon suitable stub-shafts carried by or projecting from the frame.

55 designates a paper-folding roll, which is mounted rigidly upon shaft 50 and is companion to a similar roll 55$^a$, mounted upon a shaft 56, said rolls being spaced the requisite distance apart for a folded paper to pass frictionally between them and with their peripheries in the same horizontal plane.

Figure 6:
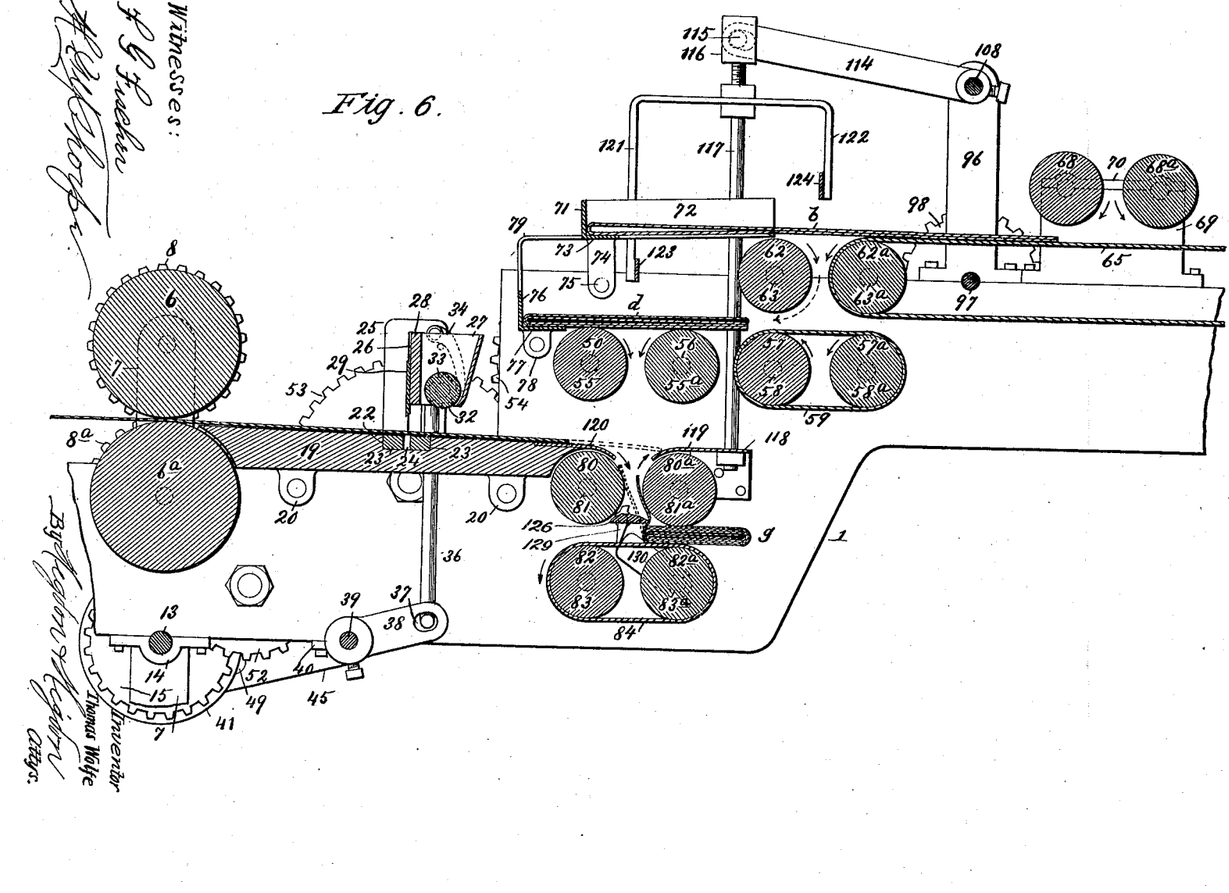
Fig. 6 is a similar view taken on the same line, but showing certain parts in different positions from those occupied in Fig. 5.

At the opposite side of the machine from the gear-wheel 54 the shafts 50 and 56 are geared together by wheels 50$^a$ and 56$^a$ in order that said rolls may operate synchronously and in the direction indicated by arrows, Fig. 6. In the same horizontal plane, but rearward of said rolls, are a similar pair of rolls 57 and 57$^a$, mounted, respectively, upon shafts 58 and 58$^a$ and connected by an endless belt or apron 59, the latter being for the purpose of transferring the folded papers to and upon the rolls 55 55$^a$.

60 designates a gear-wheel mounted upon shaft 58 of the same size and meshing with gear-wheel 54, and 61 a smaller gear-wheel on the opposite end of shaft 58.

Vertically above rolls 57 57$^a$ and in the same horizontal plane are the companion rolls 62 and 62$^a$, mounted, respectively, upon shafts 63 and 63$^a$, journaled, like those previously described, in the frame. The shafts 63 and 63$^a$ are provided with intermeshing gear-wheels 64 64$^a$, and wheel 64 also meshes with wheel 61 of shaft 58.

65 designates an endless belt or apron traveling in the direction indicated by arrows and engaging at its opposite ends rolls 62$^a$ and 66, the shaft of the latter being journaled in the frame and a boxing-cap 67, mounted thereon. Some distance rearward of roll 62$^a$ and a suitable distance above the belt 65 are companion rolls 68 and 68$^a$, with their shafts journaled in standards 69 and bearing-caps 70, mounted upon said standards.

71 designates a gage to limit the advance movement of the newspapers when quarter-folded as they come from the press, said gage being arranged in the plane of the upper side of belt 65 and a distance forward of the center of the space between rolls 62 and 62$^a$ equal to half the width of the paper when quarter-folded, as shown clearly in Fig. 6. Said gage is also provided as a precautionary measure with longitudinal guide-arms 72 for the paper and is provided at its lower side with a shelf 73 to support the advanced end of the paper when occupying the position illustrated by the letter $b$ in Fig. 6. This gage is provided with depending lugs 74, bolted, as shown at 75, to the frame, or it may be otherwise supported. Its rear and open end, to which the shelf extends, preferably terminates vertically above the roll 62 in order that the front end of the paper may have no chance to sag or drop downward after passing said roll, and thereby render unreliable the folding operation to be hereinafter described. 76 designates a second gage, also extending transversely of the machine in advance of roll 55 and provided with a horizontal shelf 77 in the plane of the upper surface of said roll, said gage being provided with depending lugs 78, which are bolted to the frame. To provide further support for the gages, they are connected by angle-arms 79, though it is to be understood, of course, that they will be subjected to practically no strain.

Vertically below the rolls 55 55$^a$ and arranged in the same horizontal plane at the front or discharge end of table 19 are rolls 80 80$^a$, mounted, respectively, upon shafts 81 81$^a$, and vertically below said rolls are a second pair 82 82$^a$, mounted, respectively, upon shafts 83 83$^a$ and connected by an endless belt or apron 84. A gear-wheel 85 is mounted upon one end of shaft 83$^a$ and meshes with a similar gear 86 upon shaft 81$^a$. Said shaft 81$^a$ also carries a gear-pinion 87, which is engaged by an oscillatory segment 88, mounted upon the frame and provided with teeth in number equal to those of said pinion in order that the latter and, through the medium of the gearing described, the rolls 80$^a$, 82, and 82$^a$ may be caused to make a complete revolution with each stroke or oscillatory movement of said segment—that is to say, with each complete back-and-forth movement of said segment said rolls make a complete revolution in one direction and then reversing revolve once around in the opposite direction. Said segment is operated by means of pivoted link 89, said link being mounted at its front end upon the wrist-pin 90 of the mutilated gear-wheel 12.

91 designates a gear-wheel upon the shaft 81.

92 designates a power-transmitting wheel suitably mounted upon the frame and provided with a series of teeth 93, extending half-way around its periphery and adapted to engage gear-wheel 91, and a circular series of teeth 94 at the side of the series 93 and engaging continuously the similar-sized gear-wheel 95 upon shaft 63. As the segment 88 swings in the direction indicated by the arrow 88 it turns, through the gearing described, the rolls 80$^a$ and 82$^a$ in the direction indicated by their respective arrows, (see Fig. 6,) and the roll 82 is turned by the belt 84. At this time roll 80, which never rotates but in the direction indicated by the adjacent arrow, Fig. 6, is stationary, because the wheel 92, driven by the engagement of its circular series of teeth 94 with wheel 95, has its non-toothed surface opposite wheel 91, which, being operated only when engaged by teeth 93, imparts a corresponding or intermittent movement to the roll 80, for a purpose which hereinafter appears, the operation of the roll 80 being timed so that said roll moves only in harmony with roll 80$^a$ and the belt.

96 designates a pair of standards mounted upon the frame between the rolls 62$^a$ and 68, and 97 designates a shaft journaled in the frame or in any other suitable manner at the base of said standards. At one end said shaft carries a gear-wheel 98, driven by a pinion 99. Journaled upon shaft 97 at the opposite side of the frame is a gear-wheel 100, driven by gear-wheel 64$^a$ and driving in turn a second idle gear 101, journaled upon a stub-shaft projecting from the frame and meshing with a gear-wheel 102, vertically above and mounted upon the shaft of the folding-rolls 68, and said gear 102 meshes with a similar gear 103 upon the shaft of the companion folding-rolls 68$^a$.

Mounted upon the shaft 97 outward of the idle gear 100 is a wheel 104, provided with an outwardly-projecting pin 105, and at the same distance from its center and a suitable distance from said pin is a second pin 106, projecting outward, and a pin 107, projecting inward, said pin 107 being practically a continuation of pin 106. Vertically above the axis of said wheel and journaled in standards 96 is a shaft 108, and mounted thereon is a depending forked arm 109 of precisely the same construction as forked arm 49, hereinbefore described—that is to say, provided with a long arm 110 and a short arm 111 at diagonally opposite points, so as to provide a slot 112 to receive the wheel 104 and a transverse slot 113 large enough to receive snugly either of said pins, in order that the crank-arms 114, projecting forward from shaft 108, near the opposite side of the frame, may swing down and up again with practically no loss of time between said movements, but with considerable loss of time between the up and down movements, such lost time being determined by the relative positions of pins 105 and 106, because after the pin 105 by engagement with branch 110 of forked arm 109 raises arms 114 the pin 106 comes into engagement with said branch and holds it elevated until, the movement of said pin still continuing, its opposite end or pin 107 engages the short branch 111 of said arm and causes arms 114 to swing downward again. The relative proportions of the parts and of the trains of gearing are such that the arms 114 move down and up synchronously with the knife and paste-fount hereinbefore described. The front or free ends of the rock-arms have a pin-and-slot connection, as at 115, with the head-blocks 116, secured at the upper ends of the vertically-reciprocatory rods 117, arranged in the spaces between the ends of the various folding-rolls and the side of the frame. As the stroke of the arms 114 is comparatively short, there is but little play of rods 117 at their upper ends, and their lower ends extend through a horizontal guide-plate 118, secured at its opposite ends to the side of the frame. Said plate 118 is arranged in about the same plane as the rear or discharge end of the table 19, and said plate and table are provided with curved extensions 119 and 120, overhanging rolls 80$^a$ and 80, respectively, and struck from the same center, plate 119 being adapted to deflect the advanced end of the wrapper upwardly (see dotted lines, Fig 6) upon the supporting plate or shelf 118, and thereby insure its proper position to receive the "paper" as it is forced downward between folding-rolls 55 and 55$^a$ in a manner hereinafter described. An inverted-U-shaped frame is mounted rigidly upon each reciprocatory rod 117, their front legs 121 being of greater length than their rear legs 122, so that when elevated to their highest point the horizontal folding-knife 123 shall be arranged vertically over and a short distance above the center of the space between the rolls 55 and 55$^a$, and a similar folding-knife 124, connecting the lower ends of the legs 122, shall be an equal distance above the center of the space between the folding-rolls 62 62$^a$ in order that the "quarter-folded" paper $b$ shall be folded between said rolls at the same instant that the "eighth-folded" paper $d$ is folded between rolls 55 55$^a$.

Before proceeding to describe the construction and operation of the device for securing the wrapper around the paper it may be well to trace the movement of the paper from the moment it enters the machine until it is folded to the requisite size—that is, to regulation size for mailing purposes. $a$, Fig. 5, designates the paper as it is fed quarter-folded from the printing-press and passes down between folding-rolls 68 68$^a$ upon belt 65, which conveys the same forward until it is arrested by the gage 71 in the position lettered $b$, Fig. 6. The reciprocatory folding-frame, constituting rods 117 and the folding-knives carried thereby, then descends and folds the paper at its middle between rolls 62 62$^a$, as indicated at $c$, Fig. 5. Immediately the paper has reached this position the frame rises, and said rolls feed it downward until its lower or front end contacts with the belt 59, which, traveling continuously in the direction indicated by the arrow, deflects the paper forward and causes it, with the assistance of rolls 62 62ª, to take the course indicated by dotted arrow, Fig. 6, with the assistance of roll 55ª, until its forward movement is limited by contact with gage 76 and it is supported upon shelf 77 and rolls 55 55ª, as indicated at $d$, being at this time eighth-folded. By the time it assumes this position the next paper has assumed the position shown at $b$, Fig. 6, and the reciprocatory frame descends, folding papers $b$ and $d$ synchronously between rollers 62 62ª and 55 55ª, respectively, as indicated at $c$ and $e$, Fig. 5. At the same instant that said reciprocatory folding-frame descends the end of the paper web has reached the position shown in Fig. 5, and therefore bridges the space between rolls 80 and 80ª, through which the paper, folded, as at $e$, must pass, the knife 30 severing the web of paper, and thereby completing a wrapper, and the roll 32 applying a strip of paste to the same at the same instant that the newspaper is caused to assume the position shown in Fig. 5.

Figures 5, 11, 12:
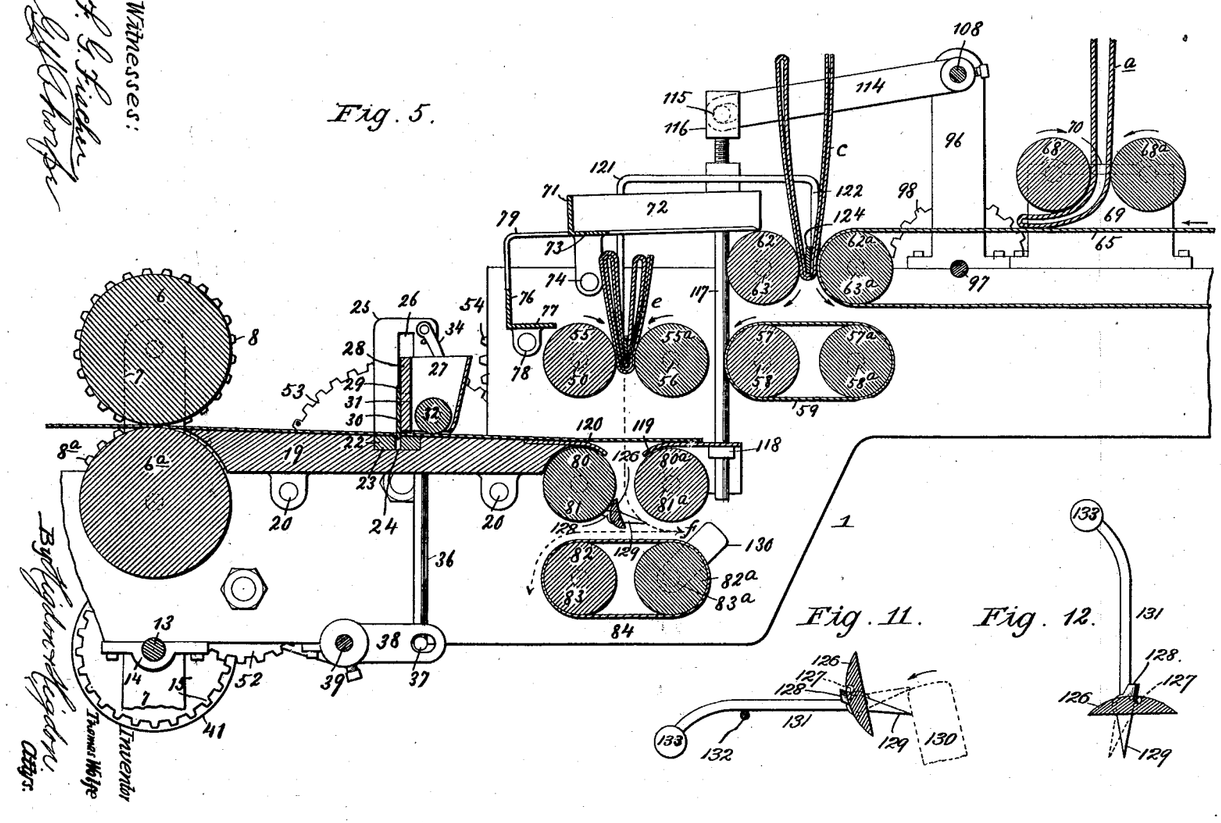
Fig. 5 is a vertical longitudinal section taken on the line V VI of Fig. 3.
Figs. 11 and 12 represent, on an enlarged scale, end views of the device for securing the wrappers upon the papers, Fig. 11 illustrating it in its normal position, and Fig. 12 in the position it assumes as it secures the ends of the wrapper together with the paper confined tightly therein.
Figures 7, 8, 9, 10:
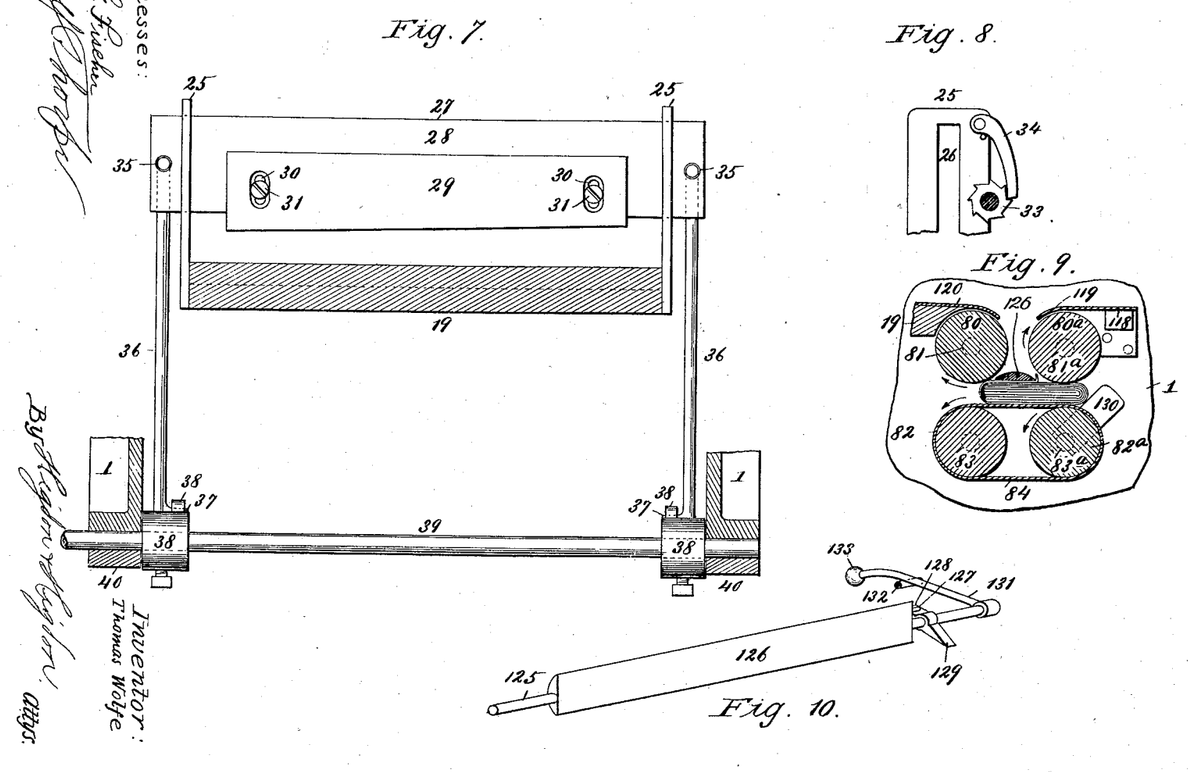
Fig. 7 is a detail transverse section to illustrate the wrapper-cutting mechanism.
Fig. 8 is a detail view to illustrate clearly the means for adjusting the pasting-roller, to be hereinafter described.
Fig. 9 is a detail view showing the paper after being folded to mailing size and form and the means for securing the wrapper thereon.
Fig. 10 is a perspective view of the device for securing the wrapper tightly around the paper.

The device or mechanism for securing the wrapper around the paper is constructed as follows—that is to say, 125 designates a horizontal transverse shaft journaled in the sides of the frame and located about at the intersecting point of a pair of imaginary lines extending horizontally rearward from the lowest point of the circumference of roll 80 and vertically downward from the rearmost point of the circumference of said roll, and 126 designates a bar, segmental in cross-section, mounted upon said shaft, so that the latter shall be slightly nearer its lower or front edge than its upper or rear edge, the flat side of the bar being alternately presented to the rear and downward, and projecting from one end of said bar, which in length of course at least equals the width of the paper, is a pin 127, said pin being located between the shaft and the edge most remote from the axis of the bar and projecting into the path of an arm 128 of a lever 129, journaled upon shaft 125, said lever being operated, as hereinafter explained, by a crank-arm 130, mounted rigidly upon the shaft 83ª. 131 designates an arm which is mounted upon shaft 125 outward of the plane occupied by the gear-wheel 54 preferably, said arm extending horizontally forward when the tension-bar 126 occupies substantially a vertical position, as shown in Figs. 5 and 10, and resting upon a stop-pin 132, projecting from the frame. The function of arm 131 is to reliably return the bar 126 to the position shown in Fig. 5 immediately after a paper provided with a wrapper is discharged from the machine, and to insure this action the arm 131 is provided with a weight 133, or a mechanical equivalent of the weight may be substituted in lieu thereof.

Figure 1:
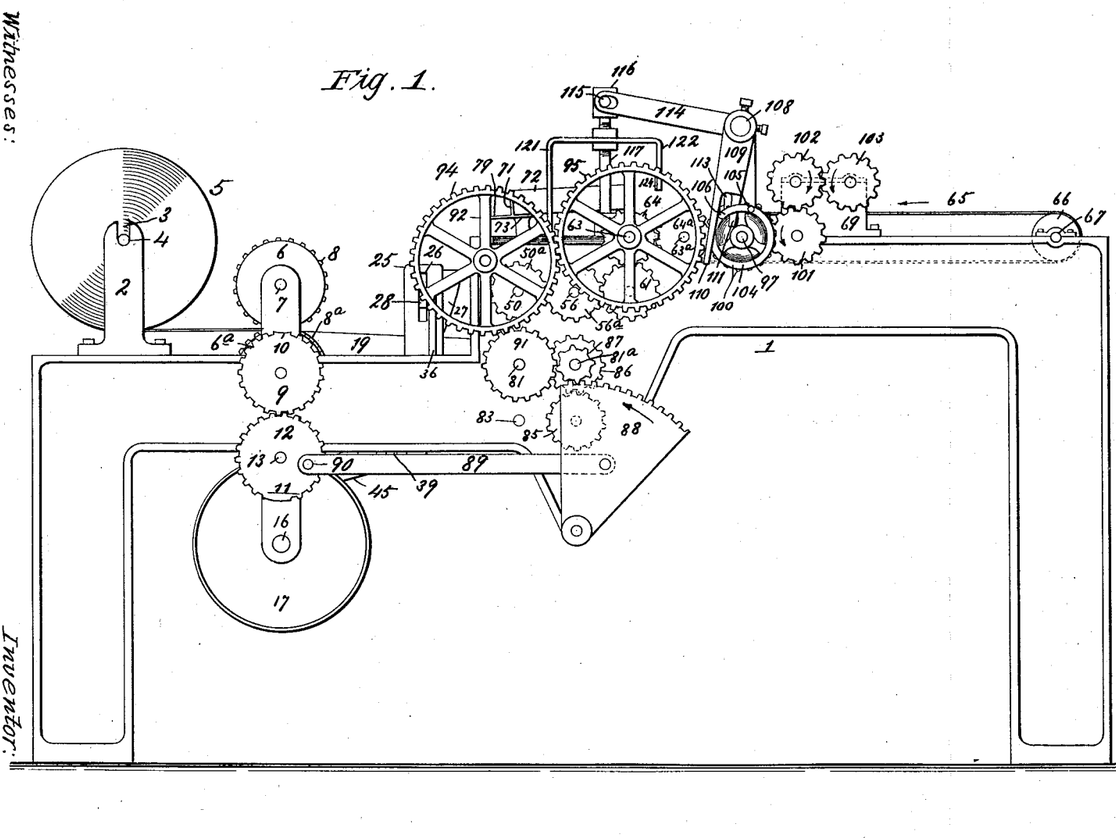
Figure 1 is a side elevation of a machine embodying my invention.

Supposing the parts to be arranged as shown in Fig. 5, it is obvious that the rolls 55 55ª force the paper $e$ vertically downward, and the intercepting wrapper with it, between rolls 80 80ª, which cause the paper to take the course indicated by arrow $f$, Fig. 5, because the advancing end of the paper strikes the tension-bar 126 and is deflected rearward until its front end clears said bar, the short end of the wrapper meanwhile being folded down upon the paper by the roll 80ª, as indicated in Fig. 6. During the latter part of this operation the intermittently-movable roll 80 ceases to rotate, (by the disengagement of wheel 91 and teeth 93,) so as to present a "dead" surface, over which the long end—$i. e.$, that supplied with adhesive material or substance—of the wrapper may trail or drag, and by the friction thus engendered between said roll and the wrapper insure that the paper shall be more tightly wrapped than if the roll continued to rotate and assist in the propulsion of the wrapper. Immediately the paper attains the position shown in Fig. 6, as at $g$, the segment 88 reverses its movement—that is, starts to operate in the direction indicated by the arrow, Fig. 1—and consequently the movement of roll 80ª, belt 84 upon rolls 82 82ª, and arm 130 upon shaft 83ª, and said arm, swinging in the direction indicated by the arrow, Fig. 11, in passing strikes and depresses lever 129, and thereby causes arm 128 of said lever by engagement with the eccentrically-disposed pin 127 to swing the bar 126 down to the horizontal position shown in Figs. 6, 9, and 12, and consequently press the long end of the wrapper—viz., that provided with the strip of adhesive material—tightly against the front edge of the folded paper, as shown in Fig. 6. By the time the tension-bar attains this horizontal position and the arm 130 clears lever 129 the front end of the paper has reached a position forward of the axis of said tension-bar, and consequently prevents the weighted arm 131, which was elevated by the action of arm 130, from swinging down to its original position, and thereby restoring the tension-bar to the position from which it was moved by the action of said arm 130. At the same instant that the movement of roll 80ª and belt 84 was reversed roll 80 resumed its rotation, so as to act in harmony with said roll 80ª and belt 84 in the advancement or propulsion of the paper in the direction indicated by the arrow, Fig. 9, beneath the bar 126, which therefore by frictional action tensions the wrapper and presses its end provided with the strip of adhesive material firmly down upon its opposite end, so that as the paper is discharged from between belt 84 and roll 80 it is in condition to be mailed. Immediately the rear end of the wrapped paper clears or passes beyond the front edge of the now horizontal tension-bar the weighted arm 131 gravitates back to its original position—that is, from the position shown in Fig. 12 to that shown in Fig. 11. In such movement the eccentrically-disposed pin of the tension-bar strikes the arm 128 of lever 129 (which being loose on the shaft resumed a pendent position immediately after the arm 130 cleared it in moving the tension-bar to its horizontal position) and raises said lever to an approximately horizontal position, as shown clearly in Figs. 5 and 11. Immediately the wrapped paper is discharged, as described, the movement of segment 88 is reversed and causes roll 80ª and belt 84 to again reverse, this reverse movement taking place just as the next newspaper and interposed wrapper are fed down by rolls 55 and 55ª between rolls 80 and 80ª. During this reverse movement, however—that is, the movement by which the paper and wrapper are fed to the position illustrated in Fig. 6—the arm 130 in passing strikes the loose lever 129 and swings it up out of the way, as indicated by dotted lines in Fig. 11, and as it passes beyond the path of said lever the latter swings down to the position shown in full lines, same figure, and therefore is in position to be acted upon by arm 130 in lowering the tension-bar to the position it must assume to complete the application of a wrapper to the paper. The succeeding operations are repetitions of those above described, and it will be noted in the various operations performed in securing the wrapper around the paper that the roll 80 never changes its direction of rotation.

As will be clear from the above description, a wrapper is thus secured upon every paper which passes through the machine, and as said machine works in connection with the printing-press, and therefore runs at a corresponding speed, it is obvious that a wrapper is applied in about the same length of time occupied in printing a paper.

While a crank or other equivalent means might be employed to cause the reciprocating action of the cutting-knife and folding-knives in lieu of the forked rock-arms and disks or wheels described, it will be impossible to obtain the same satisfactory results from its use, owing to the fact that there is an appreciable period of rest or inaction between the termination of the down and the beginning of the up strokes, which is particularly objectionable in connection with the folding-knives, owing to the fact that the continued movement of the paper, induced by the rolls as soon as said paper is forced between them by the knife, tends to draw said knife downward also, and therefore increase to an unnecessary degree friction at this point, in addition to the possibility of the paper being torn.

From the above description it will be apparent that I have produced a machine of the character described which is positive and reliable in action, and simple, strong, durable, and comparatively inexpensive of manufacture, and it is to be understood that the substitution of mechanical equivalents or changes in the form, proportion, detail construction, or organization of the parts will not be considered a departure from the spirit and scope or sacrifice any of the advantages of the invention.

Having thus described the invention, what I claim as new, and desire to secure by Letters Patent, is—

1. In a machine for folding and wrapping newspapers, a pair of rolls, one of them never changing its direction of rotation, an endless traveling belt below said rolls, means to force or feed a folded paper against a wrapper until said wrapper and said paper assume a position between and are gripped by said rolls, an oscillatory tension-bar between said rolls and belt and adapted to deflect the paper and wrapper rearward between said belt and the roll above its rear end, and means to reverse the direction of movement of said last-named roll and belt; and at the same instant to swing the tension-bar to a position substantially parallel to the belt, and thereby tension the wrapper and press one end firmly down upon the opposite end of the same, substantially as described.

2. In a machine for folding and wrapping newspapers, a pair of rolls, one of them never changing its direction of rotation, an endless traveling belt below said rolls, means to force or feed a folded paper against said wrapper until a wrapper and said paper assume a position between and are gripped by said rolls, an oscillatory tension-bar between said rolls and belt and adapted to deflect the paper and wrapper rearward between said belt and the roll above its rear end, means to reverse the direction of movement of said last-named roll and the belt, and at the same instant to swing the tension-bar to a position substantially parallel to the belt, and thereby tension the wrapper and press one end firmly down upon the opposite end of the same, and means to swing the oscillatory tension-bar back to its original position immediately after the rear end of the wrapped paper passes beyond or clears the front edge of said bar, substantially as described.

3. In a machine for folding and wrapping newspapers, a pair of rolls, one of them never changing its direction of rotation, an endless traveling belt below said rolls, means to force or feed a folded paper against said wrapper until a wrapper and said paper assume a position between and are gripped by said rolls, an oscillatory tension-bar between said rolls and belt and adapted to deflect the paper and wrapper rearward between said belt and the roll above its rear end, means to reverse the direction of movement of said last-named roll and the belt, and at the same time to swing the tension-bar to a position substantially parallel to the belt, and thereby tension the wrapper and press one end of the same, provided with adhesive material, firmly down upon its opposite end, and a weighted arm to swing the oscillatory tension-bar back to its original position, immediately after the rear end of the wrapped paper passes beyond or clears the front edge of said bar, substantially as described.

4. In a machine for folding and wrapping newspapers, a pair of rolls, one of them never changing its direction of rotation, an endless traveling belt below said rolls, means to force or feed a folded paper against a wrapper until said wrapper and said paper assume a position between and are gripped by said rolls, an oscillatory tension-bar between said rolls and belt and adapted to deflect the paper and wrapper rearward between said belt and the roll above its rear end, means to reverse the direction of movement of said last-named roll and the belt, and at the same time to swing the tension-bar to a position substantially parallel to the belt, and thereby tension the wrapper and press one end of the same, provided with adhesive material, firmly down upon its opposite end, a weighted arm to swing the oscillatory tension-bar back to its original position, immediately after the rear end of the wrapped paper passes beyond and clears the front edge of said bar, and means to arrest the gravitative movement of said arm when the tension-bar has reached its original position, substantially as described.

5. In a machine for folding and wrapping newspapers, a pair of rolls, one of them never changing its direction of rotation, an endless traveling belt below said rolls, means to force or feed a folded paper against a wrapper until said wrapper and said paper assume a position between and are gripped by said rolls, an oscillatory tension-bar between said rolls and belt, and adapted to deflect the paper and wrapper rearward between said belt and the roll above its rear end, a pin or shoulder at one end of the tension-bar, a lever swinging loosely around the axis of said bar and provided with an arm engaged with said pin or shoulder, means to change the direction of movement of the last-named roll and belt immediately the paper clears the tension-bar, and a synchronously-operated arm to strike said lever, and, through the medium of said pin or shoulder, to swing the tension-bar down upon the wrapper and paper interposed between said bar and belt, and by frictional pressure secure the adhesive end of the wrapper upon its opposite end, substantially as described.

6. In a machine for folding and wrapping newspapers, a pair of rolls, one of them never changing its direction of rotation, an endless traveling belt below said rolls, means to force or feed a folded paper against a wrapper until the latter and said paper assume a position between and are gripped by said rolls, an oscillatory tension-bar between said rolls and belt and adapted to deflect the paper and wrapper rearward between said belt and the roll above its rear end, a pin or shoulder at one end of the tension-bar, a lever swinging loosely around the axis of said bar and provided with an arm engaged with said pin or shoulder, means to change the direction of movement of the last-named roll and belt immediately the paper clears the tension-bar, and a synchronously-operated arm to strike said lever, and through the medium of said pin or shoulder to swing the tension-bar down upon the wrapper and paper interposed between said bar and belt and by frictional pressure secure the adhesive end of the wrapper upon its opposite end, means, as the paper is discharged from between the belt and the roll which never changes its direction of rotation, to restore the tension-bar and consequently the lever to their original positions, and means to cause said belt, the roller above its rear end, and said arm to reverse their direction of movement, and the latter, as it approaches its original position, in passing to knock the said lever up out of its way, substantially as described.

7. In a machine of the character described, a roll which operates intermittently but always in the same direction, a parallel companion roll rearward of the same, an endless traveling belt below said rolls, means to force a folded paper and a wrapper bridging at one side the space above the first-named rolls, between them, an oscillatory tension-bar arranged between the first-named rolls and the belt and adapted to deflect the paper and wrapper rearward between said belt and the roll above its rear end; the first-named roll ceasing to operate as the paper and wrapper are gripped firmly between the belt and the roll above its rear end, and means to synchronously reverse the movement of the belt, the roll above its rear end, and consequently of the paper, and cause the oscillatory tension-bar to assume a position substantially parallel with the belt and thereby press the adhesive end of the wrapper firmly down upon its opposite end as the paper moves forward between said bar and the belt, substantially as described.

8. In a machine of the character described, a roll which operates intermittently but always in the same direction, a parallel companion roll rearward of the same, an endless traveling belt below said rolls, means to force a folded paper and a wrapper bridging at one side the space above the first-named rolls, between them, an oscillatory tension-bar arranged between the first-named rolls and the belt and adapted to deflect the paper and wrapper rearward between said belt and the roll above its rear end; the first-named roll ceasing to operate as the paper and wrapper are gripped firmly between the belt and the said roll, means to synchronously reverse the movement of the belt, the roll above its rear end, and consequently of the paper, and cause the oscillatory tension-bar to assume a position substantially parallel with the belt and thereby press the adhesive end of the wrapper firmly down upon its opposite end as the paper moves forward between said bar and the belt, and means to cause the first-named roll to resume its rotation, and therefore act in harmony with and assist the belt and other roll in completing the application of the wrapper to the paper and in the discharge of the latter from the machine, substantially as described.

9. In a machine of the character described, a pair of parallel rolls having one side of the space between them bridged by a wrapper, a pair of rolls vertically below them, gearing connecting one of said lower rolls with the rearmost upper roll, a belt connecting said lower rolls, an oscillatory segment driving said rolls and belt, a driven mutilated gear-wheel geared to the front roll of the first-named pair, and thereby imparting to the same a movement which is intermittent but always in the same direction and in harmony with that of its companion roll and the belt, means to force the folded paper against the said wrapper until said paper and said wrapper are gripped firmly by the rolls first mentioned, a tension-bar arranged between said rolls and belt and adapted to deflect the paper and wrapper rearward, and means, as said segment reverses its movement and consequently that of the connected rolls, to swing said tension-bar to a position substantially parallel to the belt, and consequently press the adhesive end of the wrapper firmly down upon its opposite end, substantially as described.

10. In a machine of the character described, a pair of driven folding-rolls, a gage adjacent thereto, consisting of a side 71, against which the front end of the paper strikes, ends 72, projecting from the side 71 in the direction of said folding-rolls, and a horizontal shelf 73, projecting from the lower edge of the side 71, toward said rolls, and adapted to form a support for the front end of the paper, and means to fold the paper which rests upon said gage, down between said rolls, substantially as described.

11. In a machine of the character described, a pair of feed-rolls for feeding a web of printed newspaper-wrappers rearward, a transversely-grooved table to support said web rearward of said rolls, slotted standards suitably supported at opposite sides of the table and ends of said groove, a dog carried by said standards, a pair of bars arranged within said groove to form a slotted stationary knife, a vertically-reciprocating paste-fount guided in said slotted standards, a roller projecting through the bottom of the same, a ratchet-wheel movable with said roller, a knife carried by said fount, means to depress the fount and cause the knife to enter the slot of the stationary knife and sever the wrapper-web at the same instant that the paste-roller applies a strip of paste to the front end of the wrapper thus completed, and means to reëlevate the fount and knife until the ratchet-wheel is turned one step by engagement with said dog, substantially as described.

12. In a machine of the character described, a driven disk or wheel, provided with a pair of oppositely-projecting pins, a third pin projecting from one side of the disk and arranged the same distance from its axis, and a forked arm, provided with diagonally-disposed branches, which are arranged at opposite sides of the disk and with sufficient space between them to receive either of said pins; one of said branches extending past the center of the disk, and the other less than half across the disk, in order that as said forked arm is oscillated by said pins said short branch may swing from one side of the disk to the other without striking its shaft, substantially as described.

13. In a machine of the character described, a suitable frame, a table therein to support and guide a web of wrapping-paper, a stationary knife in said table below said paper, a reciprocating paste-fount carrying a movable knife to act in conjunction with the stationary knife in severing the paper, and a rotatable roll to apply paste to the wrapper severed by the knife from the web, a ratchet-wheel upon the shaft of said roller, and a dog pivoted on one of the standards and disposed in the path of said ratchet-wheel, so that after the application of paste to the wrapper, as the fount rises, said dog shall, by engaging said ratchet-wheel, rotate said roll one step in order to present a fresh surface to the next wrapper, substantially as described.

14. In a machine of the character described, the combination with a pair of driven rolls, and a folding-knife adapted to fold a newspaper and force it tightly between said rolls, of means for causing said knife to reciprocate so that practically no time is lost between the termination of the down and beginning of the up stroke, but considerable time elapses between the termination of the up and the beginning of the down stroke; said means comprising a driven disk or wheel, provided with a pair of oppositely-projecting pins, a third pin projecting from one side of the disk and arranged the same distance from its axis, and a forked arm provided with diagonally-disposed branches which are arranged at opposite sides of the disk and with sufficient space between them to receive either of said pins; one of said branches extending past the center of the disk, and the other less than half across the disk, in order that as said forked arm is oscillated by said pins said short branch may swing from one side of the disk to the other without striking its shaft, substantially as described.

15. In a machine of the character described, the combination with a stationary knife, a paste-fount carrying a roll and a companion knife, of means for causing said paste-fount to reciprocate with practically no loss of time between the termination of the down and the beginning of the up stroke, in order that the knife and paste-roller carried by the fount may sever the web of printed wrappers and apply paste to the end of the severed portion, respectively, and instantly rise out of contact with the same; said means comprising a driven disk or wheel, provided with a pair of oppositely-projecting pins, a third pin projecting from one side of the disk and arranged the same distance from its axis, and a forked arm provided with diagonally-disposed branches which are arranged at opposite sides of the disk and with sufficient space between them to receive either of said pins; one of said branches extending past the center of the disk, and the other less than half-way across the disk, in order that as said forked arm is oscillated by said pins said short branch may swing from one side of the disk to the other without striking its shaft, substantially as described.

In testimony whereof I affix my signature in the presence of two witnesses.

THOMAS WOLFE.

Witnesses:
G. Y. THORPE,
M. R. REMLEY.